2 Sheets—Sheet 1.
W. B. CRICH.
Spring Bed-Bottom.
No. 212,443.      Patented Feb. 18, 1879.
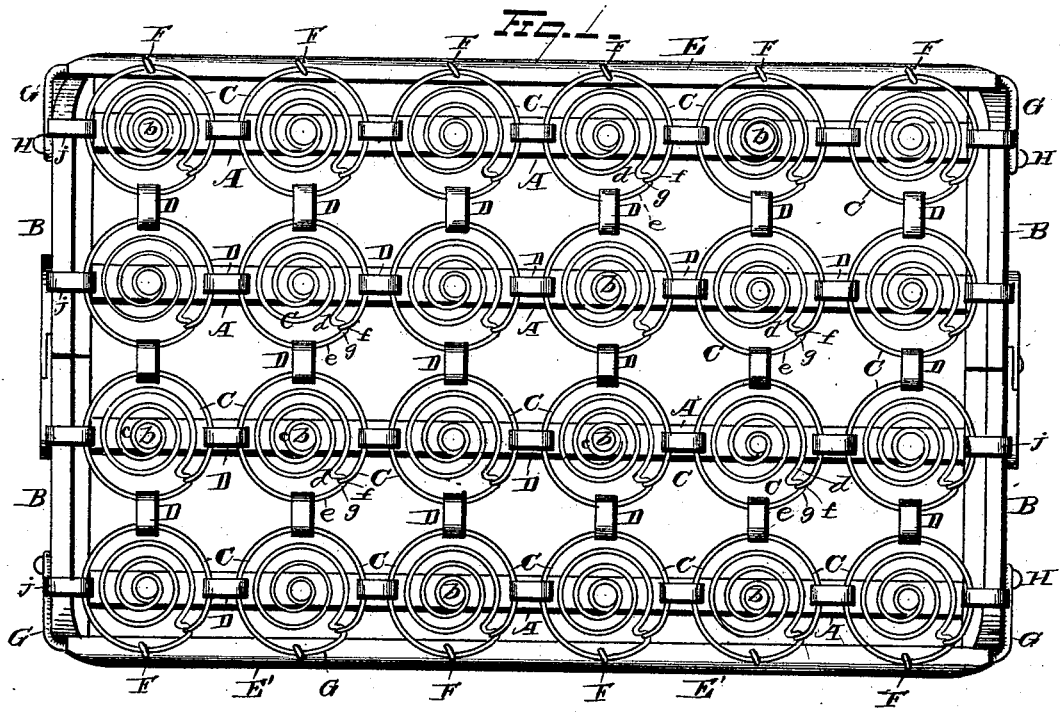
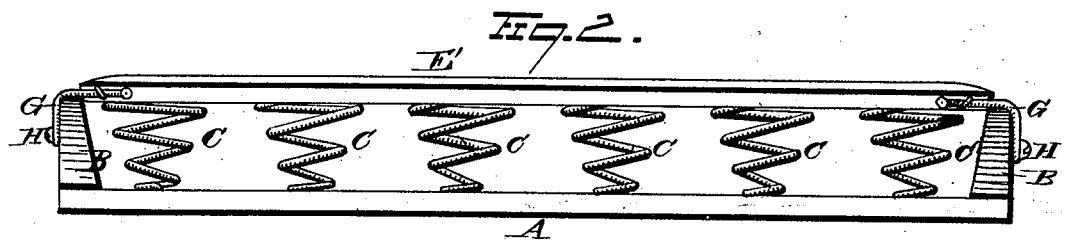
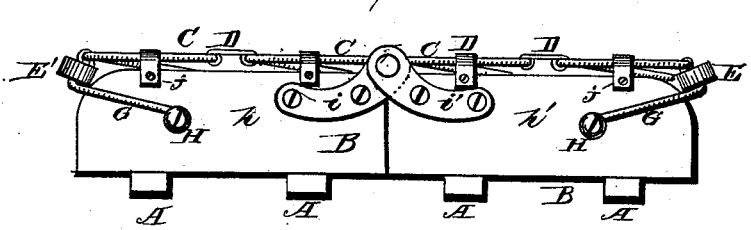
WITNESSES
E. J. Nottingham
J. D. Seymour
INVENTOR
Wm B. Crich,
By H. A. Seymour ATTORNEY
N. PETERS, PHOTO-LITHOGRAPHER, WASHINGTON, D. C.

2 Sheets—Sheet 2.

W. B. CRICH.
Spring Bed-Bottom.

No. 212,443. Patented Feb. 18, 1879.

WITNESSES
E. I. Nottingham
G. D. Seymour

INVENTOR
Wm B. Crich.
By H. A. Seymour ATTORNEY

N. PETERS, PHOTO-LITHOGRAPHER, WASHINGTON, D. C.

UNITED STATES PATENT OFFICE.

WILLIAM B. CRICH, OF YPSILANTI, MICHIGAN.

IMPROVEMENT IN SPRING BED-BOTTOMS.

Specification forming part of Letters Patent No. 212,443, dated February 18, 1879; application filed November 18, 1878.

*To all whom it may concern:*

Be it known that I, WILLIAM B. CRICH, of Ypsilanti, in the county of Washtenaw and State of Michigan, have invented certain new and useful Improvements in Spring Bed-Bottoms; and I do hereby declare the following to be a full, clear, and exact description of the invention, such as will enable others skilled in the art to which it pertains to make and use it, reference being had to the accompanying drawings, which form part of this specification.

My invention relates to an improvement in spring bed-bottoms, the object being to provide a folding bed-bottom of peculiar construction, as will hereinafter appear, whereby the bed-bottoms may be reduced to minimum compass for transportation, and effect a saving in freight charges, &c.

Figure 4:
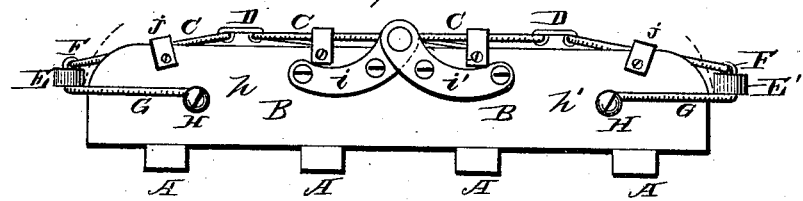
Figure 5:
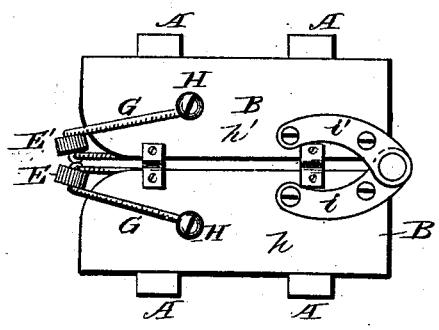
Figure 6:
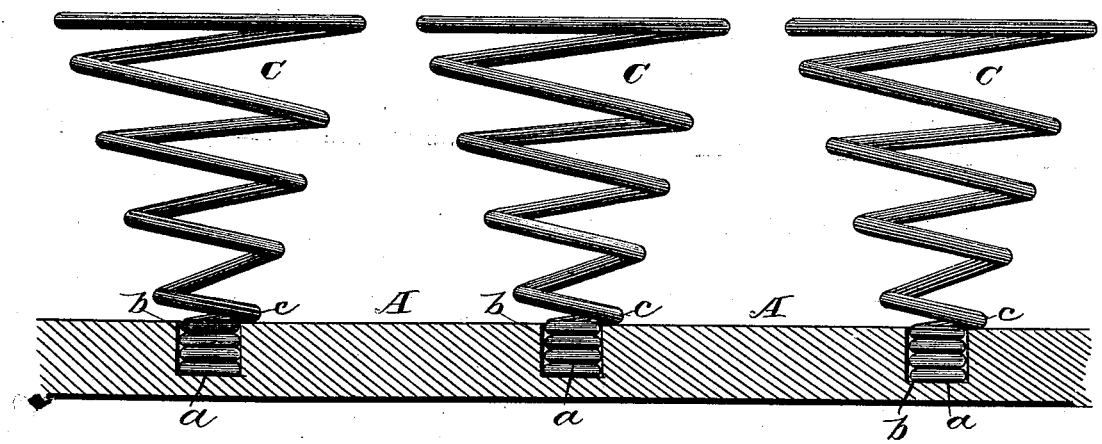

In the accompanying drawings, Figure 1 is a plan view of my improved spring bed-bottom. Fig. 2 is a side elevation, and Fig. 3 an end elevation, of the same. Fig. 4 is an end elevation, showing the side rails when in a depressed position. Fig. 5 is an end view of the bed-bottom when the sections thereof are folded together, and Fig. 6 is a vertical section through one of the bed-slats and series of springs secured therein.

A represents the slats of a bed-bottom, which are attached in any suitable manner to the lower edge of the end rails, B.

Spiral springs C are each provided with comparatively small cylindrical bearings $a$, which latter are formed by coiling the lower end of the spring around a mandrel or suitable former.

Bearings $a$ are inserted in sockets $b$, formed in the bed-slat, said sockets being of proper size, so that the cylindrical bearings may be forced therein and held snugly by frictional contact with the walls of the sockets.

The bearings are forced into their sockets, so that the upper ends of the cylinders $a$ will be practically flush with the upper surface of the slat. The lower coil, $c$, of each spring will thus have a bearing on the top of the slat, and hence vertical pressure is taken from the bearings $a$ and borne by the slats, while any lateral or vertical displacement of the springs is prevented by the cylindrical bearings $a$.

Although I have referred to bearings $a$ as being of cylindrical form, and consider such form as preferable both in manufacture and use, yet I would have it understood that I do not limit myself to such form, as the bearings $a$ may be wound about a triangular, square, rectangular, or other shaped mandrel, and thus produce a bearing of different form from that shown in the accompanying drawings, but adapted to accomplish the same object.

The several coils of the springs C gradually increase in diameter from the lower to the upper end of the spring, the coil $d$ next to the upper coil, $e$, of the spring being formed with a double return-bend of S form, and the free end $f$ of the upper coil bent downwardly around the outer loop, $g$, of the bend between the coils $d$ and $e$.

The peculiar construction of spring, as described and shown, effects the following important results: The free end of the upper coil is attached to a loop formed concentric with the coil, and hence the upper coil is circular in form, and the strain on the joint is exerted in the line of the coil, thus obviating all tendency to distort the form of the spring, as is the case when a loop or bend projects outwardly from the upper coil of the spring.

Another advantage resulting from the peculiar construction of the spring is, that the free end $f$ of the upper coil is securely held against any displacement, either lateral or longitudinal, and hence the parts of the bed are always retained in their proper relative position while the bed is in use or in transportation.

D represents loops, preferably made of sheet metal, and are attached to the upper coils of adjacent springs, so that the latter may have free vertical movement, while the entire series of springs composing the bed-bottom are linked together, and the strain on one spring is in part transferred to and borne by the adjacent springs.

E E' are side rails, to which the outside series of springs are secured by means of staples F. In order to prevent any lateral movement of the side rails independent of the movement of the springs, staples F are preferably secured in a diagonal position, as represented in the drawings, thus effectually preventing any play or movement of the wire or coil within the staple.

The ends of side rails, E E', are each provided with curved arms G, which are secured to the lower edges of the side rails, and are curved around the outer ends of the end rails, B, to which the arms are pivoted by means of a screw or stud, H. When there is no weight on the outer edges or sides of the bed-bottom, the side rails are in a raised position, as shown in Fig. 3; but when weight is borne by the side rails they are depressed and forced away from the bed through an arc of a circle, as indicated in dotted lines in Fig. 4, and thus the downward pressure on the side rails is resisted not only by the force of the springs which are attached to the rails, but also by the lateral resistance offered to the pulling action of the side rails by the entire series of springs composing the bed-bottom. This construction affords an even yielding action to all parts of the bed-bottom, and prevents undue sagging of different portions of the same, which is one of the prime objections to many of the spring bed-bottoms as now constructed.

End rails, B, are each made in two sections, $h$ $h'$, which are hinged to each other by the curved hinge-plates $i$ $i'$. The end rails, B, are of triangular form in cross-section, the slats being attached to the broad lower edges of the same. The outer sides of the end rails are vertical, while the inner sides are downwardly inclined toward the center of the bed. This construction of end rails is such that they will withstand great strain without danger of disengaging the slats therefrom, as all tendency of the end rails to rock on the slats is prevented by the broad bearings on their lower edges, to which the slats are secured. The series of springs adjacent to the end rails are secured to the latter by means of loops $j$, the inner ends of which engage with the springs, while their outer ends are bent over the upper edges of the end rails, and secured to the outer sides thereof by means of screws, rivets, staples, or equivalent devices.

When it is desired to pack my improved spring bed-bottoms for shipment they are folded together, as illustrated in Fig. 5, in which form they occupy the least possible space, and hence can be transported at minimum charges for freightage.

The bottom slats of each section are preferably secured to each other by braces, to stay the sections of the bed-bottom and prevent the independent vertical movement of the different slats.

While my improvement is designed for ordinary beds, it is also applicable to sofa-bedsteads, as the sections may be folded into small compass, as heretofore explained.

It is evident that many slight changes may be made in the construction and arrangement of the several parts of my improved spring bed-bottom without departing from the spirit of my invention, and hence I do not limit myself to the exact construction shown and described; but, Having fully described my invention, what I claim as new, and desire to secure by Letters Patent, is—

The combination, with four or more series of coiled springs, the outside series being attached to independently-yielding side rails, of end rails or frames, each composed of two sections centrally hinged to each other, and the ends of the side rails pivoted or hinged to said end rails, whereby the bed-bottom may be folded together into small compass for shipment, substantially as set forth.

In testimony that I claim the foregoing I have hereunto set my hand this 15th day of October, 1878.

WILLIAM B. CRICH.

Witnesses:
W. J. YOUNG,
B. A. PETTES.